United States Patent [19]

Longuet

[11] 4,415,407
[45] Nov. 15, 1983

[54] DOWNFLOW EVAPORATOR

[75] Inventor: André Longuet, Bethune, France

[73] Assignee: Fives-Cail Babcock, Paris, France

[21] Appl. No.: 347,993

[22] Filed: Feb. 11, 1982

Related U.S. Application Data

[63] Continuation-in-part of Ser. No. 203,048, Nov. 3, 1980, abandoned.

[30] Foreign Application Priority Data

Nov. 23, 1979 [FR] France ................... 79 28881

[51] Int. Cl.³ .................. B01D 1/10; B01D 1/22; B01D 1/30
[52] U.S. Cl. ................... 159/13 A; 159/27 D; 159/43.1
[58] Field of Search .............. 159/13 A, 27 R, 27 A, 159/27 D, 43.1; 55/447

[56] References Cited

U.S. PATENT DOCUMENTS

| | | | |
|---|---|---|---|
| 491,659 | 2/1893 | Lillie | 159/13 A |
| 1,557,838 | 10/1925 | Hiller | 159/13 A |
| 2,753,932 | 7/1956 | Eckstrom et al. | 159/13 A |
| 2,764,233 | 9/1956 | Skinner | 159/28 A |
| 2,949,935 | 8/1960 | Edmonds | 159/13 A |
| 3,351,119 | 11/1967 | Rosenblad | 159/43.1 |
| 3,412,778 | 11/1968 | Witt et al. | 159/27 D |

Primary Examiner—Bradley Garris
Attorney, Agent, or Firm—Kurt Kelman

[57] ABSTRACT

A downflow evaporator for concentrating a descending stream of liquid containing solids comprises a bundle of downflow tubes having open upper ends affixed to an upper tube sheet and open lower ends affixed to a lower tube sheet, the tubes receiving the stream of liquid through the upper ends and discharging it through the lower ends. The liquid is caused to cascade over the entire surface of the upper tube sheet whereby the liquid is distributed thereover and over the open upper tube ends. A covering is placed over the upper end of each downflow tube and spaced therefrom so as to prevent the liquid from dripping into the central portion of the tube whereby the stream of liquid descends peripherally along the inner surface of the tube.

15 Claims, 12 Drawing Figures

DOWNFLOW EVAPORATOR

This is a continuation-in-part of my copending U.S. patent application Ser. No. 203,048, filed Nov. 3, 1980 now abandoned.

The present invention relates to downflow evaporators for concentrating a descending stream of liquid containing solids by evaporating the liquid subjected to heat, for example sugar juice, and wherein the liquid to be concentrated flows in a thin film over the inner surfaces of a bundle of vertical downflow tubes whose outer surfaces are heated by water vapor. An apparatus of this type is disclosed, for example, in U.S. Pat. No. 2,753,932, dated July 10, 1956.

In such downflow evaporators, it is essential that the liquid is uniformly distributed between all the downflow tubes and, for this reason, various means have been proposed for distributing the liquid over the upper ends of the downflow tubes. The known liquid distributing means either comprise a perforated plate disposed above the upper tube sheet having openings in which the open upper ends of the downflow tubes are secured or deflectors placed over the inlets of the tubes to reduce the passage for the liquid to a small section. Such liquid distributing means lose their effectiveness, however, when the liquid contains solids in suspension since the holes in the perforated plate or the small passages become rapidly clogged by the solids. The same holds true with liquids tending to form encrustations because scale is then formed along the periphery of the holes or the deflectors and the efficiency of the apparatus is correspondingly reduced.

Furthermore, a downflow evaporator will function efficiently only if the flow of liquid through each tube is held between limits assuring optimal wetting of the tube surface. Generally, the liquid flow is insufficient and this condition has conventionally been rectified by recycling the liquid after it has passed through the evaporator. This has two disadvantages: it causes important differences in the dwell time of different fractions of the product in the evaporator, which has undesired consequences for the quality of some products which are sensitive to heat, and it causes a reduction in the thermal exchange coefficient because of the increase in the concentration of the circulating product, which is close to the desired concentration of the end product.

It is the primary object of this invention to improve the performance of downflow evaporators of the indicated type by providing better liquid distribution over all of the tubes and increasing, without recycling, the liquid flow in each tube so as to obtain optimal wetting of the inner tube surfaces.

The evaporator of the invention comprises a bundle of downflow tubes having open upper and lower ends, the tubes being arranged in rows to receive a stream of liquid containing solids through the upper ends and to discharge it through the lower ends, an upper tube sheet holding the upper ends of the tubes, a lower tube sheet holding the lower ends of the tubes, and means including at least one stratum of elongated horizontal members spaced from each other above the upper tube sheet for causing the liquid to cascade over the entire surface of the upper tube sheet whereby the liquid is distributed thereover and over the open upper ends of the downflow tubes. A covering is placed over the upper end of the each downflow tube and spaced therefrom so as to prevent the liquid from dripping into the central portion of the tube whereby the stream of liquid descends peripherally along the inner surface of the tube.

In accordance with one aspect of the present invention, radially-extending upper and lower partitions respectively divide the spaces above the upper sheet and below the lower tube sheet into compartments, respective ones of the upper and lower partitions extending in the same vertical plane, and each compartment housing a respective one of the liquid distributing means whereby independently functioning evaporator sections are provided.

The above and other objects, advantages and features of this invention will become more apparent from the following detailed description of certain now preferred embodiments thereof, taken in conjunction with the accompanying schematic drawing wherein.

Figure 1:
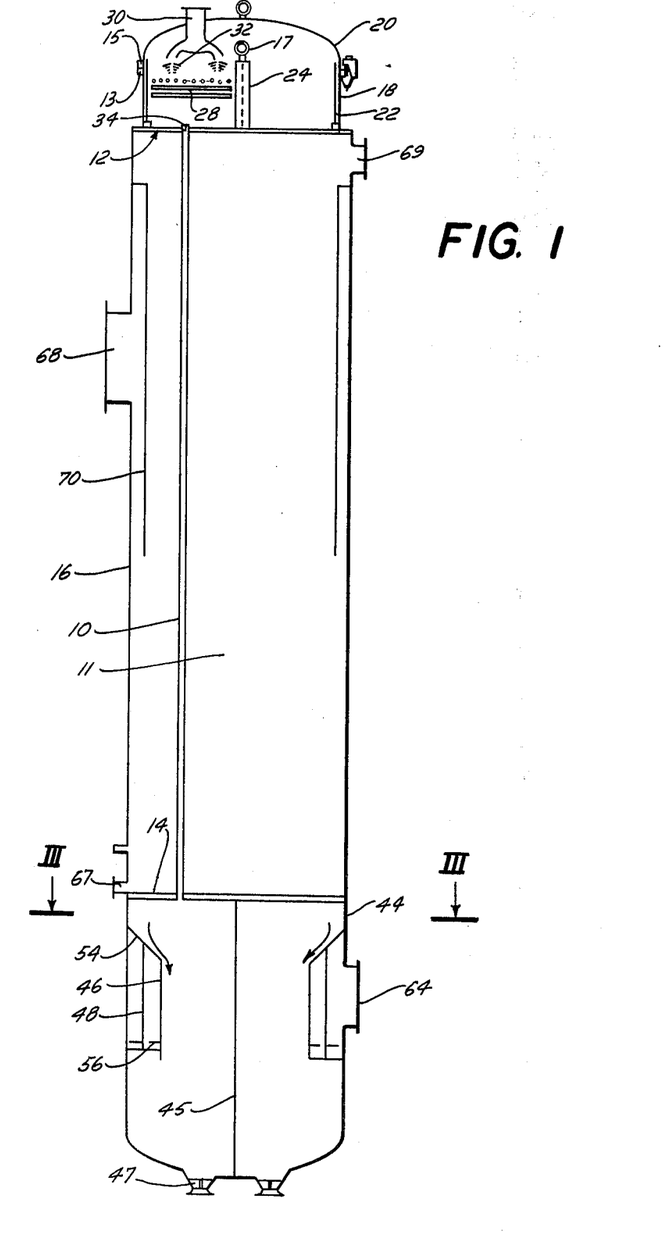
FIG. 1 shows a downflow evaporator according to the invention in axial vertical section.
Figure 2:
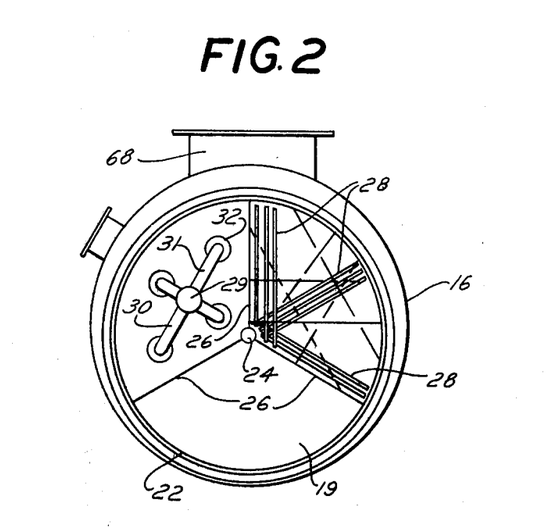
FIG. 2 is a top view of the evaporator of FIG. 1, with the cover removed and certain elements of the liquid distributing means omitted for a clearer showing.
Figure 3:
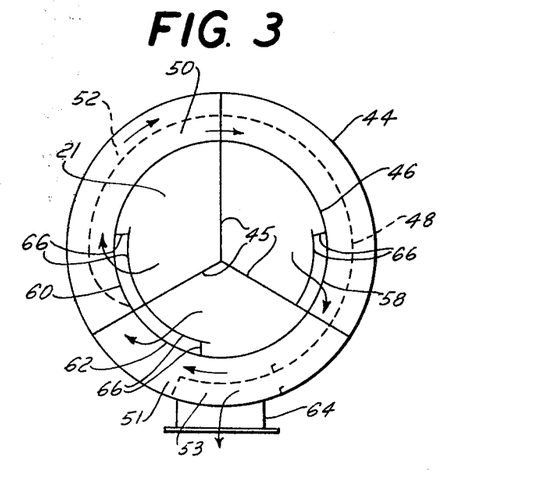
FIG. 3 is a sectional view taken along line III—III of FIG. 1.

Referring now to the drawing and first to FIGS. 1 to 3, there is shown a downflow evaporator which comprises a bundle of downflow tubes 10 (represented by a single tube in FIG. 1 for the sake of clarity), the vertical tubes being arranged in rows to receive a stream of liquid containing solids through the upper open ends thereof and to discharge it through the lower open ends thereof. The upper and lower ends of vertical tubes 10 are held, respectively, in upper tube sheet 12 and lower tube sheet 14, the tube sheets having holes in which the tube ends are secured. Cylindrical casing 16 surrounds the bundle of downflow tubes 10 and is fluidtightly secured to the peripheries of the tube sheets to define therewith vapor chamber 11, vapor inlet 68 being provided on the casing to supply hot water vapor to chamber 11. A considerable number of downflow tubes 10 is mounted in the vapor chamber, the tubes being spaced from each other and being arranged in three groups of chordally extending parallel rows enclosing an angle of 120°.

Figure 2A:
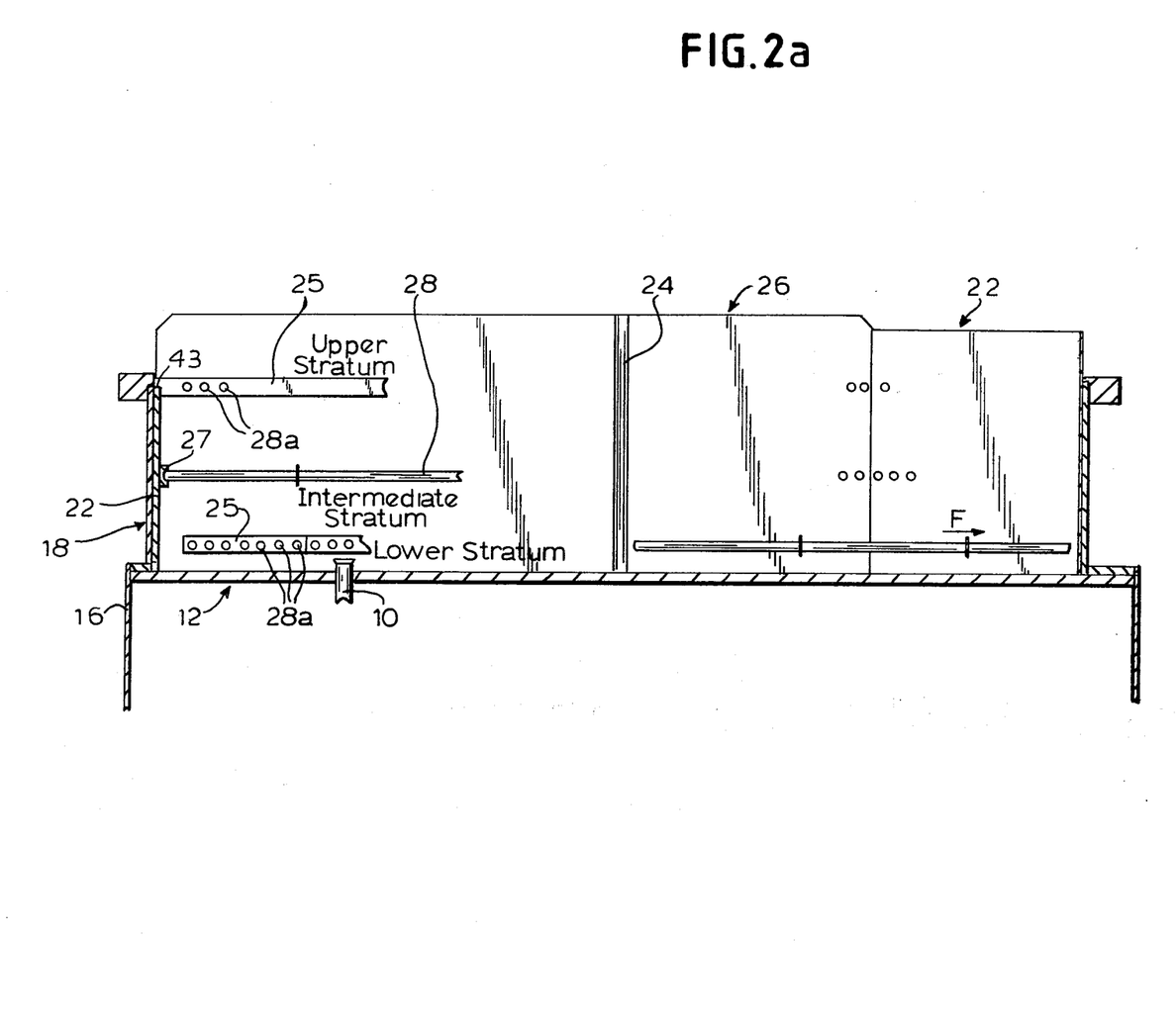
FIG. 2a is a simplified side elevational view, partly in section, of FIG. 2.
Figure 2B:
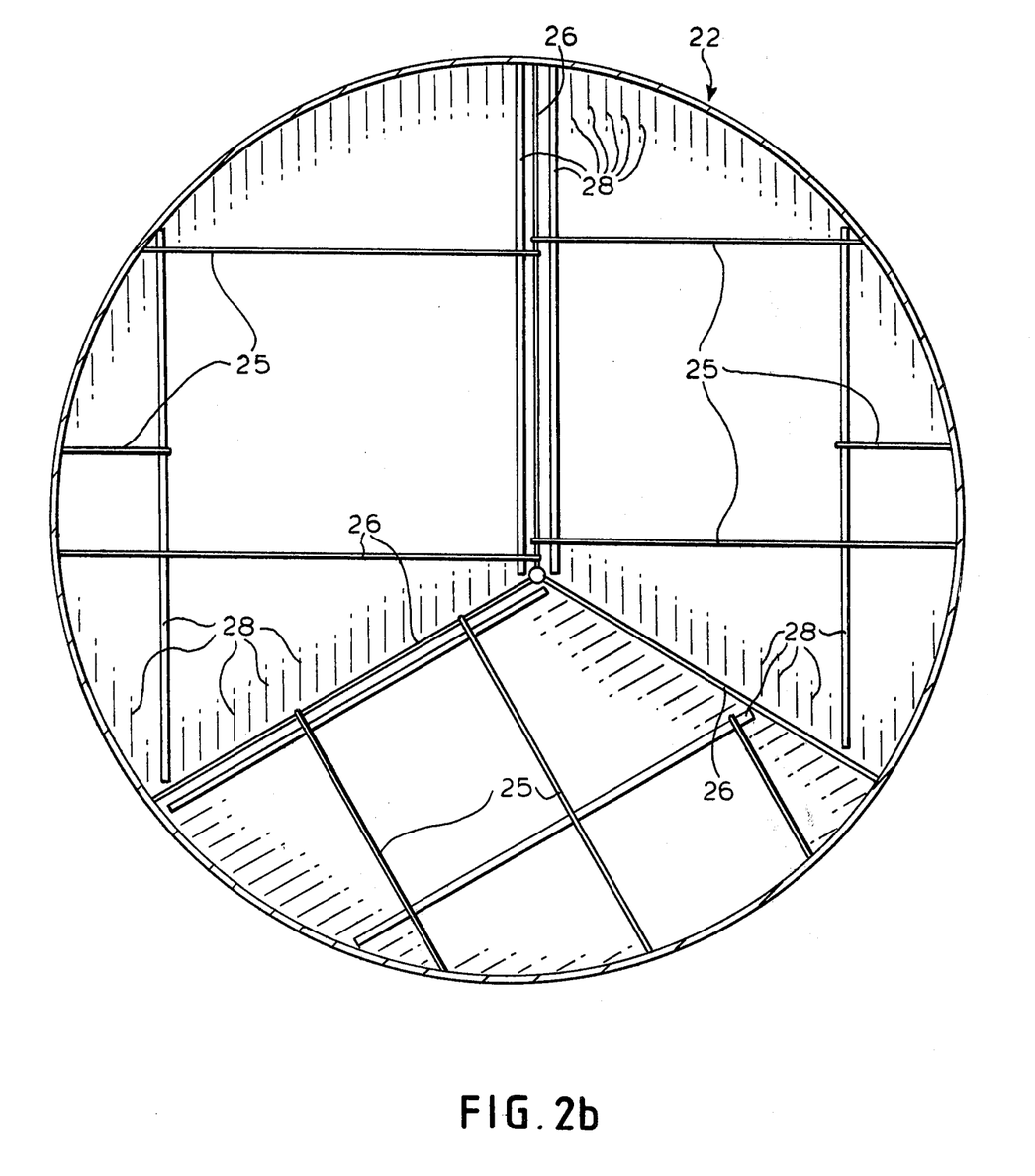
FIGS. 2b to 2e are top views showing, respectively, the upper, intermediate and lower stratum of elongated horizontal members constituting the liquid distributing means illustrated in FIGS. 2 and 2a, and the upper tube sheet with the open upper ends of the downflow tubes.
Figure 2C:
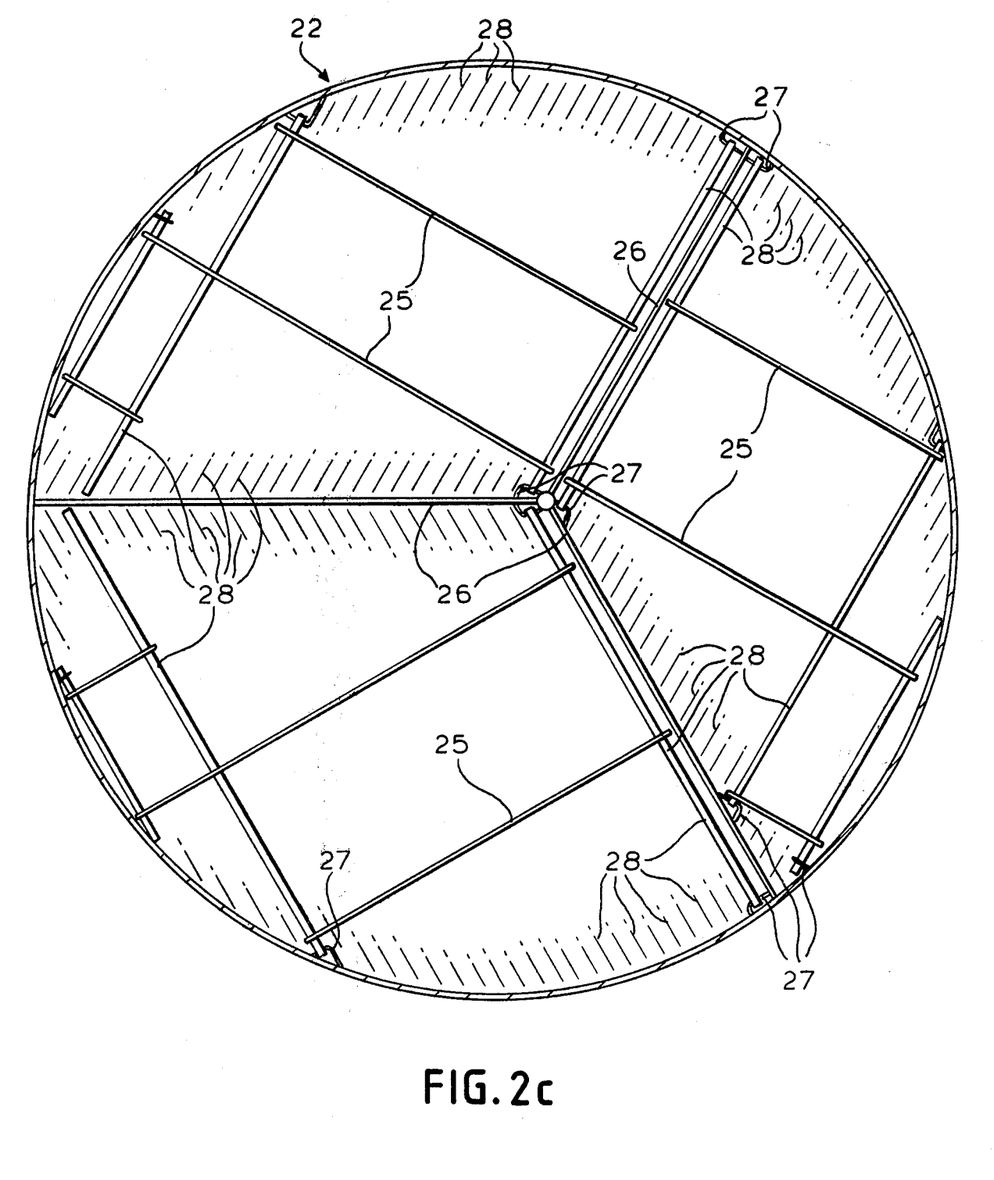
Figure 2D:
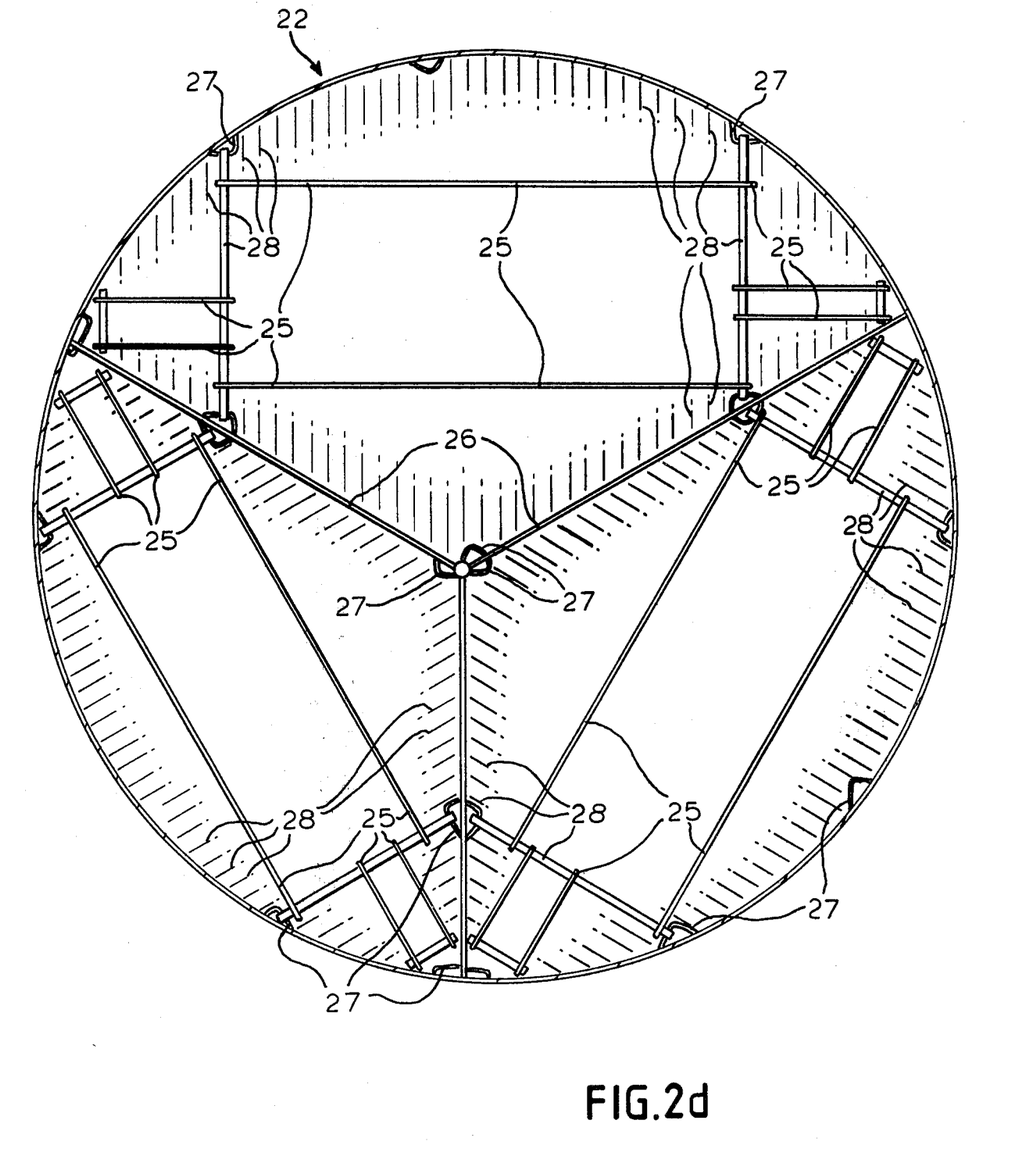
Figure 2E:
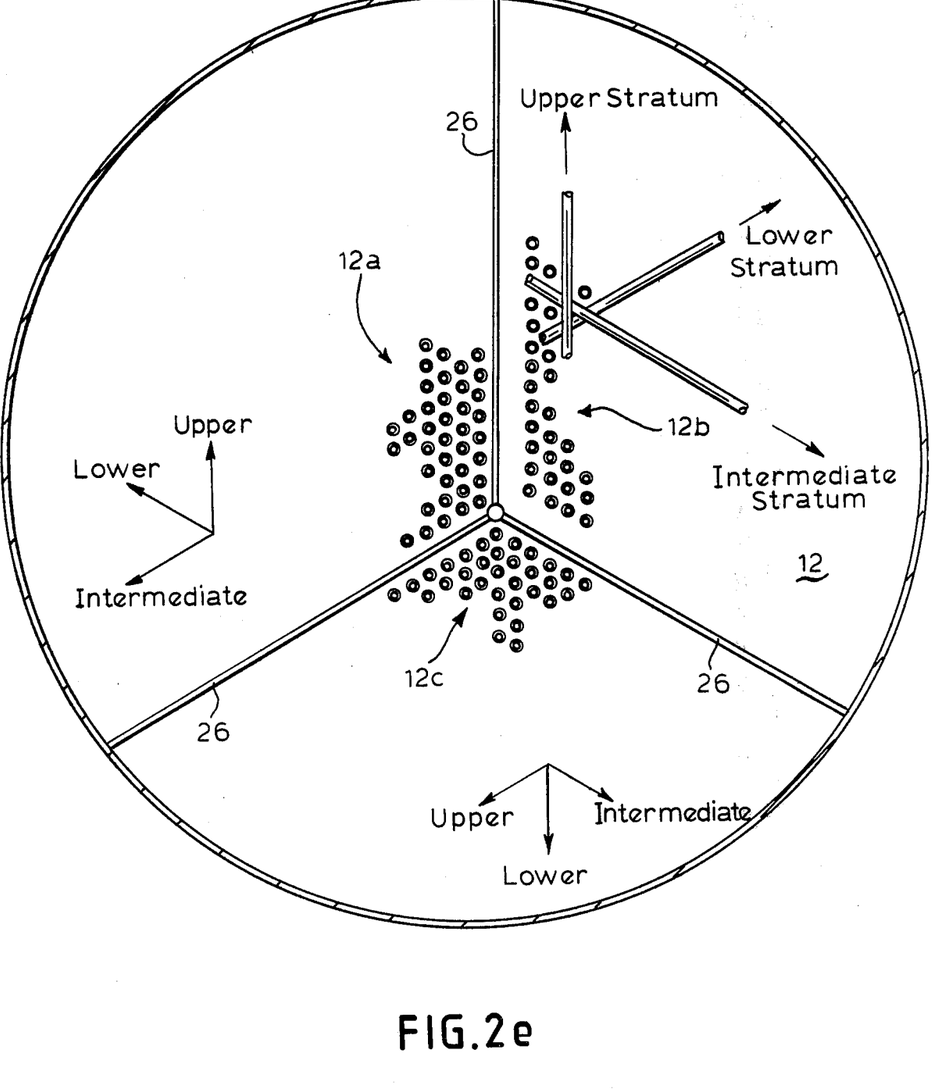

The arrays of downflow tubes 10 in the illustrated embodiment is shown in FIG. 2e which illustrates upper tube sheet 12 defining three groups 12a, 12b and 12c of rows of holes to which the open upper ends of the downflow tubes are welded. Each group of downflow tubes comprises chordally extending rows parallel to partitions 26 (to be described hereinafter), each group of downflow tubes being arranged in a sector between two vertical planes defined by the partitions and enclosing an angle of 120°. For the sake of clarity, only an illustrative portion of the groups of downflow tubes are shown in this figure and similarly partial illustrations are used for the same reason in FIGS. 2a to 2d.

Cylindrical sleeve 18 is welded to the upper surface of upper tube sheet 12, the upper rim of sleeve 18 carrying flange 13 for attachment of convex cover 20 to sleeve 18, the cover carrying flange 15 mating with flange 13 and screws or bolts being provided for detachably connecting flanges 13 and 15 so that the cover may be removed from the evaporator for repair or cleaning of the liquid distributing means mounted within covered sleeve 18 above upper tube sheet 12 and capable of causing the liquid to cascade over the entire surface of the upper tube sheet whereby the liquid is distributed thereover and over the open upper ends of downflow tubes 10 through the holes in the upper tube sheet.

The illustrated liquid distributing means of the preferred embodiment described herein includes several levels or strata of elongated horizontal members 28, the members of each stratum being parallel to each other and the orientation of the horizontal members of each stratum differing from that of the members of the other strata (see FIGS. 2 and 2b, 2c, 2d). If desired, a single stratum of horizontal members 28 may be provided and the spaced horizontal members of this stratum or at least the lowest stratum, in case several strata are provided, are disposed above a respective row of downflow tubes 10. In FIG. 2e, arrows indicate the direction in which the horizontal members of each stratum extend in relation to the arrays of downflow tubes in each sector. In the preferred embodiment and as shown in FIG. 2a, the liquid distributing means comprises cylindrical sleeve 22 of a slightly smaller diameter than that of encasing sleeve 18 and concentric therewith, cylindrical sleeve 22 supporting horizontal members 28 and resting on upper tube sheet 12. Sleeve 22 and horizontal members 28 constitute a replaceable unit which may be lifted out of cylindrical sleeve 18 after cover 20 has been removed, thus enabling the liquid distributing means to be replaced, cleaned or repaired. In the illustrated embodiment, this replacement unit further comprises axially extending pillar 24 which supports three partitions 26 extending radially between the pillar and cylindrical sleeve 22. The partitions enclose angles of 120° and divide the space above upper tube sheet 12 into three sectoral compartments 19. The three partitions and the rows of downflow tubes 10 are parallel to each other.

Each compartment 19 houses a respective liquid distributing means whereby three identical independently functioning evaporator sections are provided. The illustrated liquid distributing means comprises three strata of horizontal members 28, the members being parallel and spaced from each other in each stratum, and the horizontal members of each stratum being disposed exactly above a respective row of vertical tubes 10.

Horizontal members 28 may be tubes or they may be bars constituted, for example, by angle irons having an upwardly extending leg, or disposed with their apex at the top.

Flat connecting elements 25 constituted by elongated iron braces defining bearing holes 28a for horizontal members 28 hold the members of each stratum in position. As best shown in FIGS. 2b, 2c, 2d, braces 25 in each stratum are braced by two of the horizontal members which are welded to the braces and respective ends of the braces may also be supported on cylindrical sleeve 22 and/or partitions 26. As shown in FIGS. 2c and 2d, respectively illustrating the intermediate and lower strata, the ends of horizontal members 28 are held in lugs 27, welded to sleeve 22 and partitions 26. Braces 25 in the upper stratum rest on shoulders on sleeve 22 and partitions 26, as indicated at 43 in FIG. 2a showing an indented end of a brace engaging a shoulder on sleeve 22. The strata are vertically spaced from each other.

For the sake of clarity of illustration, FIGS. 1 and 2 show horizontal tubes 28 only in one of the compartments 19 and FIG. 2 illustrates only a part of members 28 in one compartment, the liquid distributing means in the two other compartments being identical and not shown. The schematic showings of FIGS. 2b, 2c, and 2d illustrate the upper, intermediate and lower strata, respectively.

The illustrated liquid distributing means for each compartment 19 further includes tubular inlet 30 comprised of central inlet conduit 29 and several, i.e., four, inlet branches 31 for delivering the stream of liquid into each compartment separately, a single inlet 30 being shown in FIGS. 1 and 2 for the sake of clarity. A series of vertically spaced conical deflectors 32 is disposed below each inlet branch 31 and the conical deflectors define central bores vertically aligned with each other. The outer diameters of deflectors 32 and the diameters of the central bores are progressively smaller from deflector to deflector in a descending direction, as shown in FIG. 1. These deflectors cause the liquid coming from inlet branches 31 to cascade over horizontal members 28 of the uppermost stratum for distribution thereover. By capillary action, the liquid spreads along the entire length of horizontal members 28 and then drips onto the horizontal members of the intermediate stratum where the same phenomenon occurs, the liquid finally cascading onto the horizontal members of the lowermost stratum and then onto upper tube sheet 12. Since a horizontal member 28 of the liquid distributing means is positioned above each row of downflow tubes 10 and extends the entire length of such row of tubes, the stream of liquid is distributed over the entire tube sheet between the rows of tubes 10. It should be noted, in this connection, that only the disposition of horizontal members 28 of the lowest stratum parallel to, and above, the rows of tubes 10 is important. The other strata of horizontal liquid distributing members only have the purpose of distributing the liquid over the underlying horizontal liquid distributing members, and the latter horizontal liquid distributing members could be differently oriented. Also, only two strata or even a single stratum of liquid distributing members may suffice for efficient operation of the evaporator.

Even though horizontal membes 28 of the lowest stratum are disposed above each row of downflow tubes 10, it may happen that streams of liquid drip into the central portion of the downflow tubes, which must be avoided. Therefore, according to one aspect of the present invention, covering 38 is placed over the upper end of each downflow tube 10 and spaced therefrom so as to prevent the liquid from dripping into the central portion of the tube whereby the stream of liquid descends peripherally in an annular film along the inner surface of the tube. As shown in FIGS. 4-7, the covering is part of an insert 34 disposed in the open upper end of each downflow tube 10 so as to shield this open end from direct access of liquid.

Figure 4:
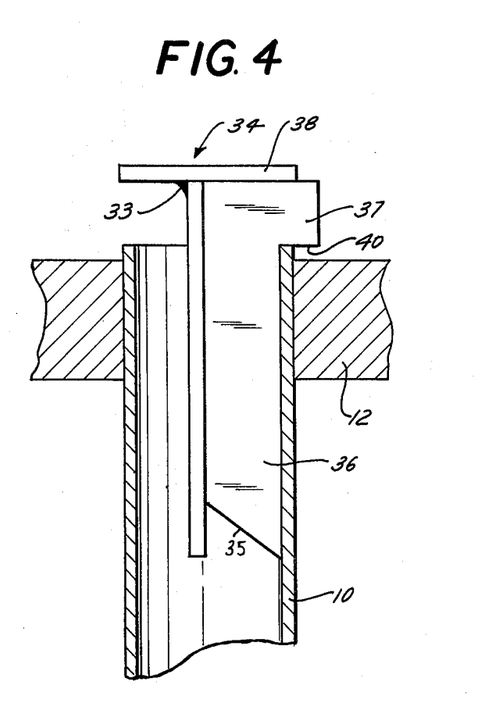
FIG. 4 is an enlarged side elevational view, partly in section, of the open upper end of one downflow tube and the covering therefor.
Figure 5:
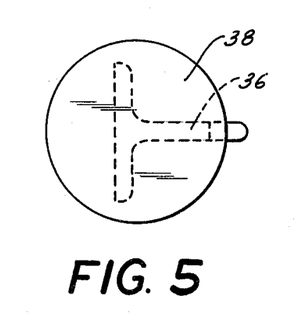
FIG. 5 is a top view of the covering of FIG. 4.

The illustrated insert comprises a support element having an upper end carrying covering 38 and a lower end extending into the downflow tube, the upper end of the support element spacing the covering from the upper end of tube 10. As shown in FIG. 4, the upper end of the support element rests on the upper end of the tube but, functionally equivalently and if the upper end of the tube were substantially flush with upper tube sheet 12, the upper end of the support element may rest on the upper tube sheet. In the embodiment illustrated in FIGS. 4 and 5, the support element is a T-shaped metal piece 36 having three wings 37, a center wing extending perpendicularly from the two other wings of the metal piece. At least the center wing defines shoulder 40 intermediate the upper and lower ends of the support element and the support element rests on the shoulder engaging the upper end of downflow tube 10. Covering 38 is a metal disc secured to the wings of T-shaped metal piece 36 by welds 23.

The support element wings have bevelled inner ends 35 and outer edges terminating lower than the central part of the support element. In this manner, the liquid flowing down the wings will be directed radially outwardly towards the inner surface of downflow tube 10. Covering 38 is flat and has a diameter approximately equal to the outer diameter of downflow tube 10. If desired, the covering may be convex and its diameter may be slightly larger than that of the downflow tube.

Since the coverings are substantially spaced from the upper tube ends and the cross sectional area of the support elements inserted into the downflow tubes is quite small with respect to that of the tubes, there is no danger of the entrance of the downflow tubes being obstructed by impurities which may be present in the liquid to be concentrated.

Figure 6:
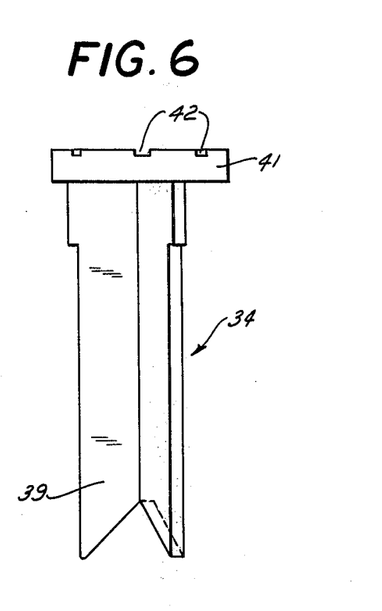
FIG. 6 is a side elevational view of a modified covering to be placed over an open upper end of a downflow tube.
Figure 7:
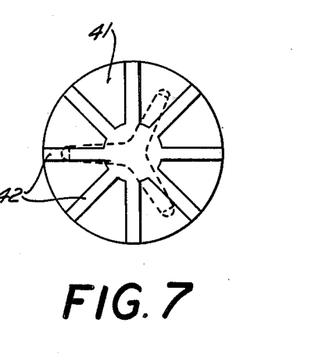
FIG. 7 is a top view of the covering of FIG. 6.

Modified insert 34 shown in FIGS. 6 and 7 consists of a support element and covering constituted by an integral synthetic resin molding. Instead of being T-shaped, the support element has three wings 39 equidistantly spaced by angles of 120° from each other. Covering 41 has an upper surface defining a series of radial grooves 42 disposed at regular intervals. This will assure improved distribution of liquid over the entire periphery of the covering.

As shown in FIG. 1, cylinder 44 is attached to lower tube sheet 14 and, like cylinder 22, it is divided into compartments 21 providing independently functioning evaporator sections by lower partitions 45. Upper partitions 26 and lower partitions 45 extend in the same vertical planes. Each compartment 21 has an outlet port 47 at the bottom thereof.

Cylinder 44 houses a centrifugal separator for separating droplets entrained by the vapor and receives the concentrated stream of liquid discharged through the lower open ends of downflow tubes 10 which communicate with compartments 21. The illustrated centrifugal separator includes two concentric cylindrical sleeves 46 and 48 defining two circular passages 50 and 52 extending along cylinder 44 over an angle exceeding 270°. Interior circular passage 50 communicates with a central space of cylinder 44 defined by inner cylindrical sleeve 46 through opening means 60 and the interior circular passage leads to one end 51 of exterior circular passage 52. Vapor escape outlet 64 is attached to other end 53 of exterior circular passage 52. Exterior circular passage 52 is defined between cylindrical sleeves 44 and 48 while interior circular passage 50 is defined between sleeves 46 and 48. The two passages are covered on top by inclined annular roof 54 and, at their base, a system of baffles 56 permits flow of the separated liquid received in the circular passages towards the interior of sleeve 44.

Two of the compartments 21 defined by partitions 45 communicate with interior circular passage 50 through large openings 58 and 60 in inner cylindrical sleeve 46. The vapor generated in the evaporator sections corresponding to these compartments enters into passage 50 through these large openings and flows, as indicated by the arrows in FIG. 3, to entrance end 51 of circular passage 52 where this vapor flow is mixed with the vapor coming from third compartment 21 through opening 62 in cylindrical sleeve 46. The total flow of vapor then flows through passage 52 to the outlet end 53 where it leaves the evaporator through outlet port 64. While the vapor flows through circular passages 50 and 52, the droplets of liquid are separated from the vapor by centrifugal force and are deposited respectively on cylindrical sleeves 48 and 44. These liquid deposits then flow down the surfaces of the sleeves by gravity past baffles 56 and through outlet ports 47.

Gutters 66 are mounted above the upper edges of openings 58, 60 and 62 and the vertical sides opposite adjacent partition 45, and these gutters receive liquid dripping down from inclined annular roof 54, thus avoiding the formation of a curtain of liquid in front of the openings, which the vapor would have to penetrate.

The three evaporator sections are connected in series and are successively traversed by the liquid to be concentrated. The connections between the evaporator sections are conventional and may be comprised, for example, of centrifugal pumps. For a given throughput of liquid, this enables a better wetting of downflow tubes 10 to be obtained without the need for recycling the concentrated liquid. In this way, the dwell time for each liquid drop is substantially the same. In such a system, a smaller average liquid concentration is obtained in each evaporator section than would be encountered in an apparatus with recycling, which improves the heat exchange coefficient of each evaporator section and, therefore, the entire evaporator and correspondingly diminishes discoloration of the product and substantially attenuates deteriorations in heat-sensitive products.

In operation, heating vapor is introduced into chamber 11 through vapor inlet 68 in casing 16. While condensing on the outer surfaces of downflow tubes 10, the vapor yields heat to the tubes and evaporates the liquid flowing down along the inner surfaces of the heated tubes. An annular baffle 70 is placed over the vapor inlet to enhance the efficiency of the vapor distribution over the bundle of downflow tubes and to protect the tubes in front of the vapor inlet. Water outlets 67 or the water of condensation are provided at the bottom of casing 16 and vapor outlets 69 at the top of the casing permit excess vapor to escape from chamber 11 when such excess vapor is delivered to the chamber to seep over the bundle of downflow tubes to eliminate incondensible light particles.

The stream of liquid and the vapor generated during the evaporation thereof descend along downflow tubes 10 into compartments 21 in cylinder 44. In one of the compartments, the liquid drips to the bottom of cylinder 44 where it is exhausted by a pump (not shown) and delivered to the next evaporator section or to another operating station while the vapor is separated by the centrifugal separator and removed through outlet port 64.

While the downflow evaporator of this invention has been described and illustrated as comprising three independently functioning sections connected in series, this number may obviously be varied and selected in each case to obtain optimal tube wetting conditions. If the throughput is sufficient, the evaporator may be conventionally operated with a single passage of liquid to be concentrated therein. Furthermore, many structural modifications and variations may occur to those skilled in the art without departing from the spirit and scope of the invention as defined in the appended claims.

What is claimed is:

1. An evaporator for concentrating a descending stream of liquid containing solids, which comprises
    (a) a bundle of downflow tubes having open upper and lower ends, the tubes being arranged in rows to receive the stream of liquid through the upper ends and to discharge it through the lower ends,
    (b) an upper tube sheet holding the upper ends of the tubes,
    (c) a lower tube sheet holding the lower ends of the tubes,
    (d) means including several strata of elongated horizontal members spaced from each other above the upper tube sheet for causing the liquid to cascade over the entire surface of the upper tube sheet whereby the liquid is distributed thereover and over the open upper ends of the downflow tubes,
        (1) each horizontal member of each stratum being disposed above a respective one of the rows of downflow tubes, the members of each stratum being parallel to each other and the angular orientation of the horizontal members of each stratum differing from that of the members of the other strata and
    (e) a covering placed over the upper end of each downflow tube and spaced therefrom so as to prevent the liquid from dripping into the central portion of the tube whereby the stream of liquid descends peripherally along the inner surface of the tube.

2. The evaporator of claim 1, further comprising a support element having an upper end carrying the covering and a lower end extending into the downflow tube, the upper end of the support element spacing the covering from the upper end of the tube.

3. The evaporator of claim 2, wherein the upper end of the support element rests on the upper end of the tube.

4. The evaporator of claim 2, wherein the upper end of the support element rests on the upper tube sheet, the upper end of the tube being substantially flush with the upper tube sheet.

5. The evaporator of claim 3 or 4, wherein the support element is comprised of at least three wings disposed at an angle to each other, at least one of the support element wings defining a shoulder intermediate the upper and lower ends of the support element and the support element resting on the shoulder.

6. The evaporator of claim 5, wherein the support element wings have bevelled inner ends and outer edges terminating lower than the central part of the support element.

7. The evaporator of claim 2, wherein the support element and the covering are of metal, and the covering is welded to the upper end of the support element.

8. The evaporator of claim 2, wherein the support element and the covering are constituted by an integral molding.

9. The evaporator of claim 1 or 2, wherein the covering has an upper surface defining a series of radial grooves disposed at regular intervals.

10. The evaporator of claim 1 or 2, further comprising a cylindrical sleeve supporting the horizontal members and resting on the upper tube sheet, the cylindrical sleeve and the horizontal members constituting a replaceable unit.

11. The evaporator of claim 1 or 2, wherein the horizontal members are constituted by tubes.

12. The evaporator of claim 1 or 2, further comprising radially extending upper and lower partitions respectively dividing the spaces above the upper tube sheet and below the lower tube sheet into sectoral compartments, respective ones of the upper and lower partitions extending in the same vertical plane, and each of the upper compartments housing a respective one of the liquid distributing means whereby independently functioning evaporator sections are provided.

13. The evaporator of claim 12, wherein the partitions extend parallel to the rows of downflow tubes.

14. The evaporator of claim 1 or 2, wherein the liquid distributing means includes a tubular inlet having several inlet branches for delivering the stream of liquid, and a series of vertically spaced conical deflectors disposed below each one of the inlet branches, the conical deflectors defining central bores aligned with each other, the outer diameters of the deflectors and the diameters of the bores being progressively smaller from deflector to deflector in a descending direction.

15. The evaporator of claim 1 or 2, further comprising a cylinder attached to the lower tube sheet and a centrifugal separator arranged in the cylinder to receive the stream of liquid discharged through the lower open ends of the downflow tubes, the separator including two concentric cylindrical sleeves defining two circular passages extending along the cylinder over an angle exceeding 270°, an interior one of the circular passages communicating with a central space of the cylinder defined by an inner one of the cylindrical sleeves through opening means in the inner cylindrical sleeve and the interior circular passage leading to one end of an exterior one of the circular passages, and a vapor escape outlet attached to the other end of the exterior circular passage.

* * * * *